United States Patent [19]

Renner

[11] Patent Number: 4,740,961
[45] Date of Patent: Apr. 26, 1988

[54] FRAME CHECKING ARRANGEMENT FOR DUPLEX TIME MULTIPLEXED REFRAMING CIRCUITRY

[75] Inventor: Robert E. Renner, Glendale, Ariz.

[73] Assignee: GTE Communication Systems Corporation, Phoenix, Ariz.

[21] Appl. No.: 925,044

[22] Filed: Oct. 30, 1986

[51] Int. Cl.$^4$ .............................. H04J 3/00; H04J 3/16
[52] U.S. Cl. ........................................ 370/100; 370/16
[58] Field of Search ............... 370/16, 100, 99; 371/7, 371/8, 68; 375/17

[56] References Cited

U.S. PATENT DOCUMENTS

| | | | |
|---|---|---|---|
| 3,509,532 | 4/1970 | Vande Wege | 371/8 |
| 3,781,795 | 12/1973 | Zegers | 371/8 |
| 4,030,069 | 6/1977 | Hendrickson et al. | 371/8 |
| 4,310,901 | 1/1982 | Harding et al. | 371/8 |
| 4,413,335 | 11/1983 | Clements et al. | 370/16 |
| 4,504,947 | 3/1985 | Perry | 370/99 |
| 4,514,844 | 4/1985 | Perry | 370/16 |
| 4,516,245 | 5/1985 | Perry | 375/17 |
| 4,534,027 | 8/1985 | Perry | 370/16 |
| 4,543,651 | 9/1985 | Chang | 370/16 |
| 4,552,997 | 11/1985 | Daniels et al. | 370/16 |
| 4,592,044 | 5/1986 | Ferenc | 371/68 |
| 4,598,268 | 7/1986 | Perry | 375/17 |

Primary Examiner—Salvatore Cangialosi
Attorney, Agent, or Firm—Frank J. Bogacz; Peter Xiahros

[57] ABSTRACT

Telecommunication switching systems are typically connected by high-speed digital data spans. These spans may commonly be T1 or T2 carriers using DS1 or DS2 data formats, respectively. These systems may contain duplex digital span control units. Synchronization circuitry includes a time multiplexed state machine for each copy of the digital span control unit. The state machine monitors framing alarm signals from its own copy as well as from the other copy of the digital span control unit. This circuitry detects whether the framing alarm signals for each copy are identically synchronized. If these framing alarm signals are not identically synchronized, then one copy of the circuitry executes a hold (wait) operation for the other copy of the circuit to perform its reframing operation. For non-error conditions, the wait places the two copies back in synchronization. This arrangement applies stringent checking criteria to framing and synchronization bits, which have been previously found, to insure that these bits are the correct ones. As a result, the duplex units are more likely to remain synchronized.

11 Claims, 3 Drawing Sheets 4,740,961

FRAME CHECKING ARRANGEMENT FOR DUPLEX TIME MULTIPLEXED REFRAMING CIRCUITRY

BACKGROUND OF THE INVENTION

The present invention pertains to digital transmission systems and more particularly to maintaining proper framing between multiple copies of time multiplexed digital span equipment.

Modern telecommunication systems transmit large amounts of data rapidly between systems. Digital spans are utilized to connect these systems and to transmit this data. The switching system usually contains a number of digital spans, each span transmitting data at a high rate between switching systems.

For public policy reasons, these switching systems must be highly reliable. In order to achieve this reliability, these systems are often implemented with redundant equipment. This redundancy scheme is a way of providing for fault tolerance of the system. That is, if one portion of the system fails there is a second portion of the system performing exactly the same process. The system functions properly, but in a simplex mode.

The redundant equipment is typically operated in a synchronous fashion. This prevents total system down time as a result of switch-over from one copy of the equipment to the other. It also provides a means of fault detection if the two copies differ.

U.S. Pat. Nos. 4,531,210 and 4,507,780 deal with duplex digital span controllers for one such system. This system is the GTD-5 EAX manufactured by GTE Communication Systems Corporation, the assignee of the present application. These patents teach duplex digital control units which operate synchronously. However, these digital control units serve a number of digital spans and therefore require a multiplexing operation. Because of the high-speed data and the nature of scanning, signal propagation times through similar circuits may vary. That is, at a particular instant, one copy of a circuit may see a framing bit set and the other duplex copy of that circuit may not see the corresponding framing bit set. Therefore, synchronization is difficult to maintain in multiplexed reframing operations. Since finding proper framing is a trial and error process, quickly locating framing and synchronization bits will aid in maintaining synchronization of the duplex digital span equipment.

Accordingly, it is an object of the present invention to provide an arrangement for maintaining proper framing between multiple copies of time multiplexed digital span equipment.

SUMMARY OF THE INVENTION

A telecommunication systems is connected to other telecommunication systems by a plurality of digital spans. One of these telecommunication systems has a duplex pair of synchronously operated digital control units. One of these digital control units operates to scan the plurality of digital spans for a proper framing synchronization as an active unit, while the other digital control unit of the pair operates to scan the plurality of digital spans for a proper framing synchronization as a standby unit. Each of the digital control units includes a framing synchronization arrangement.

Each framing synchronization arrangement has a clock circuit which is operated to provide periodic time slot signals. Each framing synchronization arrangement also has included a timing circuit, a state machine and an error checking circuit.

The timing circuit is connected to the clock circuit. The timing circuit operates in response to the time slot signals of the clock circuit to produce a count signal which has a predetermined frequency.

The state machine is connected to the other copy of the digital control unit of the duplex pair. The state machine is connected to the copy of the digital control unit in which the state machine resides. The state machine is also connected to the timing circuit. The state machine operates in response to framing alarm signals of each of the digital control units to produce two state signals. These state signals have first and second values, respectively, and correspond to a HOLD END state.

Each digital control unit produces both a framing check address and a framing alarm address. The framing check address indicates the identity of the digital span currently being examined for proper framing. The framing alarm address indicates the identity of the digital span which is out of proper framing.

The error checking circuit is connected to the state machine and to the corresponding digital control unit. In response to an equality condition of the framing check address with the framing alarm address and in response to the state signals representing the HOLD END state, the error check circuit changes error checking requirements from 2 framing errors in the previous 5 framing bits to 1 framing error in the previous 1 framing bit.

A BRIEF DESCRIPTION OF THE DRAWINGS

DESCRIPTION OF THE PREFERRED EMBODIMENT

Figure 1:
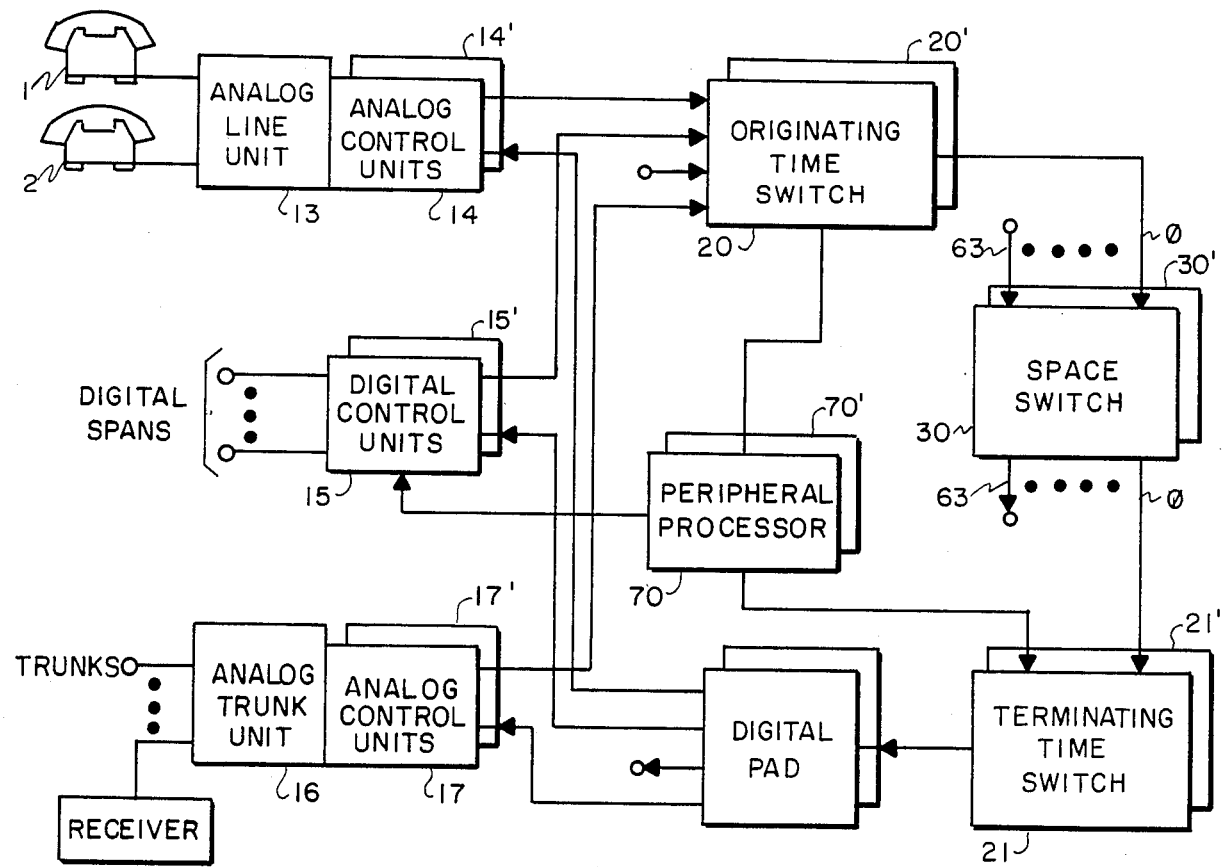
FIG. 1 is a block diagram of a switching system featuring the interconnection of digital spans to the switching system through digital control units.

Referring to FIG. 1, a time-space-time digital switching network along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to duplex pair of space switch units 30 and 30' which are in turn connected to the terminating time switch 21 and 21'. Time switch and control units 21 and 21' are connected to analog control unit 14 and 14' and ultimately to the telephone subscribers 1 and 2 via analog line circuit 13.

Digital control units 15 and 15' connect the digital spans to the switching network. Digital span equipment may be implemented using commonly available T1 digital span equipment such as a model 9004 manufactured by Siemens Transmission Systems Inc. Similarly, analog trunk unit 16 connects trunk circuits to the digital switching network via analog control units 17 and 17'.

A peripheral processor CPU 70 controls the digital switching network and digital and analog control units. Analog line unit 13 and a duplex pair of analog control units 14 and 14' interface to telephone subscribers directly. A duplicate pair of digital control units 15 and 15' control the incoming PCM data from the digital spans. Similarly, the analog trunk unit 16 and a duplex pair of analog control units 17 and 17' interface to trunk circuits. The analog and digital control units are each duplicated for reliability purposes.

Figure 2:
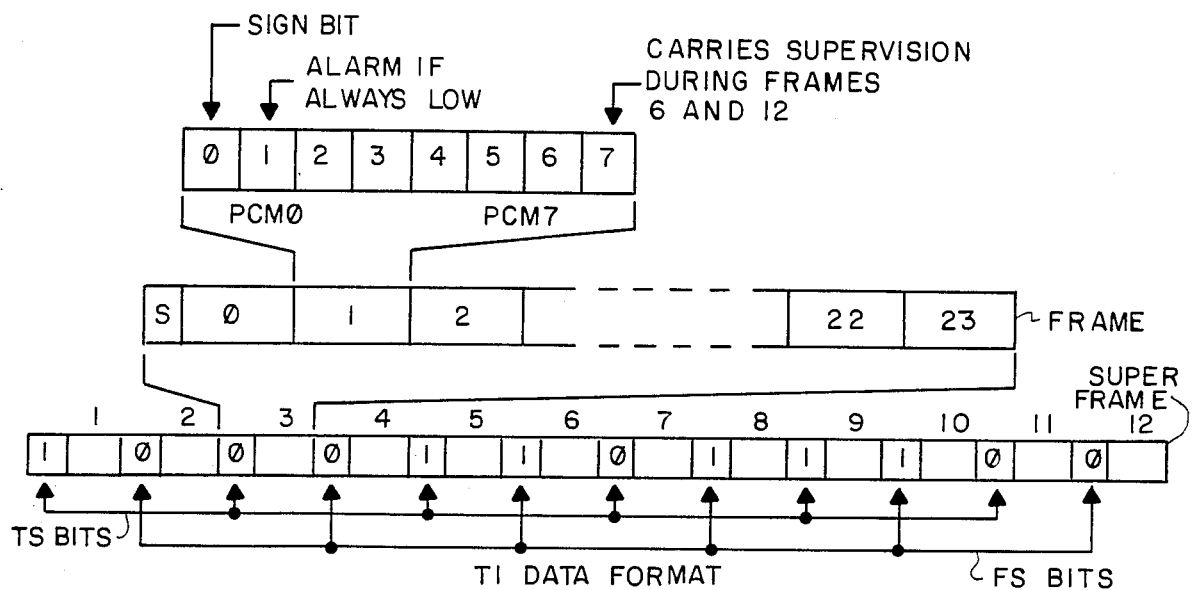
FIG. 2 is a bit and frame format of T1 transmission for the digital spans shown in FIG. 1.

The nature of a T1 data and its format is shown in FIG. 2. Each voice sample consists of eight bits, PCMO–PCM7. PCMO is a sign bit. PCM1–PCM7 give the magnitude of the voice sample. PCM1 may also be used to convey alarm indications. PCM7 is used to carry supervision information during frames 6 and 12.

Twenty-four voice samples are organized together with an S bit to form a frame. Each voice sample in the frame is associated with one channel of voice (or data). The channels are numbered 0–23. The S bit carries a periodic pattern which, when detected, is used to identify the beginning of each frame of data. Twelve frames of data are organized to form a "super frame". During frames 6 and 12 of the super frame, PCM7 is used to carry supervision information associated with each of the 24 channels. The periodic pattern of data carried by the S bit also makes it possible to identify the individual frames within a super frame.

The pattern carried on the S bit is as follows (the first bit is associated with frame 0): "100011011100". It can be seen that during the odd numbered frames, the S bit forms an alternating pattern of "1"s and "0"s, i.e., "101010". This alternating pattern is referred to as the TS pattern and is used to identify the starting position of the frames. During the even numbered frames the S bit carries the pattern "001110", where the first "1" indicates the beginning of frame 6. This pattern is referred to as the FS pattern and is used to identify the position within a super frame.

Every time a TS bit occurs, a frame detector compares it with the value that it expects to see (ones during frames 1, 5, and 9; zeroes during frames 3, 7, and 11). If the TS bit disagrees with the expected value, it is considered an error. If two errors occur during any five consecutive examinations of TS bits for a digital span (T-carrier), then that digital span is considered to be out of frame. An alarm condition is operated. Eventually, an attempt will be made to reframe that T-carrier.

Examination of FS bits is an analogous procedure to that of the TS bits.

When reframing is attempted for a digital span, the frame detector examines each bit position for a period of 16 frames. If any bit position has consistently toggled during alternate frames, then that bit position is assumed to be the correct framing bit position, and the contents of a write vector will be updated to reflect the new S bit position.

If the TS pattern is properly aligned, but the FS pattern is in error, the frame detector will increment a write vector by four frame positions. This will occur every time the FS pattern is in error until eventually the write vector is properly aligned with the incoming FS pattern.

Figure 3:
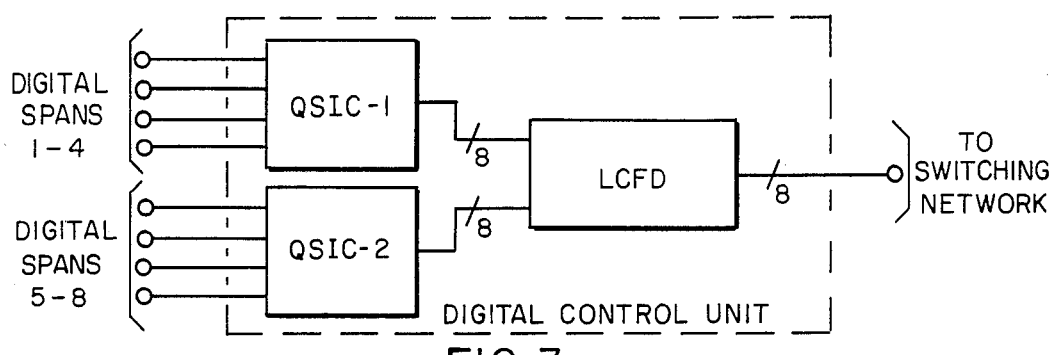
FIG. 3 is a block diagram of a portion of the digital control unit which processes the conversion of digital span data from serial to parallel and buffers the data for up to 8 digital spans.

FIG. 3 depicts a portion of the circuitry included in each of the digital control units 15 and 15'. Each digital control unit controls up to 8 digital spans. Digital control units 15 and 15' as shown in FIG. 1, are duplex digital control units. This means that each digital control unit 15 and 15' handles data transmission between the switching system and the same 8 digital spans. Further, digital control units 15 and 15' operate synchronously. This is, they perform the same task at the same time in order to provide a fault tolerant system. This system allows a failure in one of the digital control units 15 or 15' and permits the switching system to operate through the other unit of the duplex pair.

The connection of 8 digital spans to a digital control unit such as 15 or 15' is shown. Digital spans 1 through 4 are shown connected to QSIC-1 (Quad Span Interface Circuit). Digital spans 5 through 8 are shown connected to QSIC-2. Digital spans 1 through 4 and 5 through 8 are also connected to QSIC-1' and QSIC-2' respectively. These QSICs and connections are not shown in FIG. 3. Each QSIC converts the information to or from the digital spans from serial to parallel and sets a flag (buffer full) when 8 bits of data have been collected for a particular digital span. Each QSIC performs these functions for the 4 digital spans to which it is connected.

QSIC-1 and QSIC-2 are connected to the LCFD (Line Compensator and Framing Detector). The LCFD scans each of the 8 flags representing the 8 digital spans at a rate which is twice as fast as the data rate of a digital span. Data is taken from a particular digital span when the flag is set. When one copy of the duplex LCFDs sees the flag for data set for a particular digital span, the other copy may not at that exact time see the flag set. However, this copy of the LCFD should see the flag set on its next scan.

Although the duplex LCFDs are operating synchronously, they may not see the flag set during the same scan because of the propagation delays of signals through various logic. Therefore, in order to provide synchronization for reframing operations between the two duplex LCFDs and corresponding between the two duplex digital control units 15 and 15', the reframing synchronization circuitry of FIG. 4 is provided.

Figure 4:
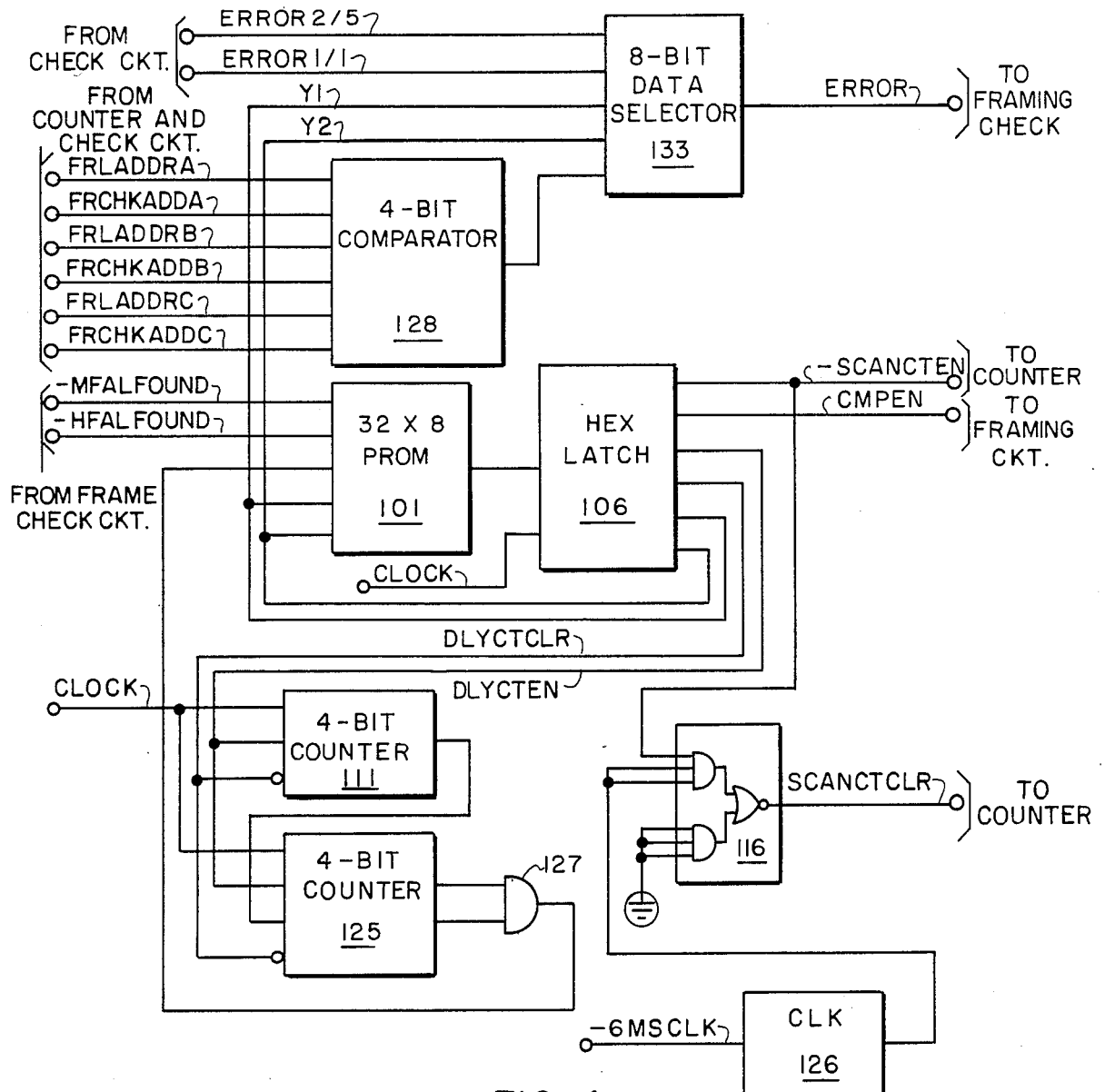
FIG. 4 is a schematic diagram embodying the principles invention of the present invention.

Each copy of the LCFD (Line Compensator and Frame Detection Circuit) includes a circuit as shown in FIG. 4. The -MFALFOUND signal (My Frame Alarm Found) is transmitted from the frame check circuit of the corresponding copy to 32 by 8-bit PROM 101. A signal from the other copy of the frame check circuit is transmitted via the -HFALFOUND lead (His Frame Alarm Found) to PROM 101.

Six data out leads connect PROM 101 to HEX latch 106. A clock signal transmitted on the CLOCK lead is also input to HEX latch 106. Two outputs of HEX latch 106 are feed back as inputs to PROM 101. One of the outputs of HEX latch 106 is connected to 4-bit counter 111 via the DLYCTEN (Delay Count Enable). HEX latch 106 is also connected to 4-bit counter 111 via the DLYCTCLR lead (Delay Counter Clear).

The clock is also connected to 4-bit counters 111 and 125 via the CLOCK lead. The carry output of 4-bit counter 111 is connected to an input of 4-bit counter 125. Two of the outputs of 4-bit counter 125 are connected to AND gate 127. The output of AND gate 127 is connected as an input to PROM 101. As a result, the contents of PROM 101 are read as a function of the My Frame Alarm Found and His Frame Alarm Found and other inputs for each digital span. That is, PROM 101 is a time multiplexed state machine.

Another output of HEX latch 106 is the scan counter enable (SCANCTEN) signal. This signal enables the scanning operation for proper framing of each digital span to be stopped or started. The HEX latch 106 is connected to the time slot counter via the SCANCTEN lead. Another output of HEX latch 106 is the comparator enable signal transmitted on the CMPEN lead to the framing circuit.

Gates 116 and 126 operate to clear the scan counter. The scan counter enable signals is connected to combination AND-NOR gate 116 via the SCANCTEN lead. The clock is connected to J-K flip-flop 126 via the −6 MSCLK lead. This lead provides a 6 millisecond clock signal to the input J-K flip-flop 126. J-K flip-flop 126 used to generate narrow pulse from 50% of the 6 millisecond signal. The output of J-K flip-flop 126 is connected to an input of AND-NOR gate 116. The output of AND-NOR gate 116 is the scan counter clear signal which is connected to the time slot counter circuit via the corresponding lead.

The time slot counter and check circuit are connected to 4-bit magnitude comparator 128. The framing alarm address signals (FALADDRA, FALADDRB and FALADDRC) connect the time slot counter to comparator 128. The frame check address leads (FRCHKADDA, FRCHKADDB and FRCHKADDC) connect the framing check circuitry to comparator 128. The EQ output signal of 4-bit magnitude to comparator 128 is produced for equality of the frame check address and frame alarm address. The EQ lead is connected between comparator 128 and 8 bit data selector 133. Other inputs to 8-bit data selector 133 are the state control signals Y1 and Y2. Y1 is the low order bit of the state address and Y2 is the high order bit of the state address. The values of Y1 and Y2 maybe taken from the table below.

TABLE

| State | Y2 | Y1 |
|---|---|---|
| Idle | 0 | 0 |
| Hold Start | 0 | 1 |
| Go | 1 | 1 |
| Hold End | 1 | 0 |

Other inputs to the 8-bit data selector 133 are the error 2/5 signal and the error 1/1 signal. The error 2/5 signal indicates that 2 errors have been received in the last 5 framing bits. The error 1/1 signal indicates that 1 error has been received in the last 1 framing bit. The output of the 8 bit data selector is the ERROR signal which indicates that an error has been detected and reframing must occur. The ERROR lead is connected to the framing check circuitry.

The duplex frame detector circuitry is controlled by a state machine residing in each copy of the LCFD. This state machine is composed of PROM 101, HEX latch 106, 4-bit counters 111 and 125 and AND gate 127. This state machine functions to insure that both copies of the LCFD operate in synchronization for reframing each of the digital spans.

This circuitry monitors the out of frame signals from its own copy as well as the other copy of each of the digital spans. The out of frame signal for the copy shown in FIG. 4 is the My Frame Alarm Found (-MFALFOUND) signal. The out of frame signal for the other copy is the His Frame Alarm Found (-HFALFOUND) signal.

Figure 5:
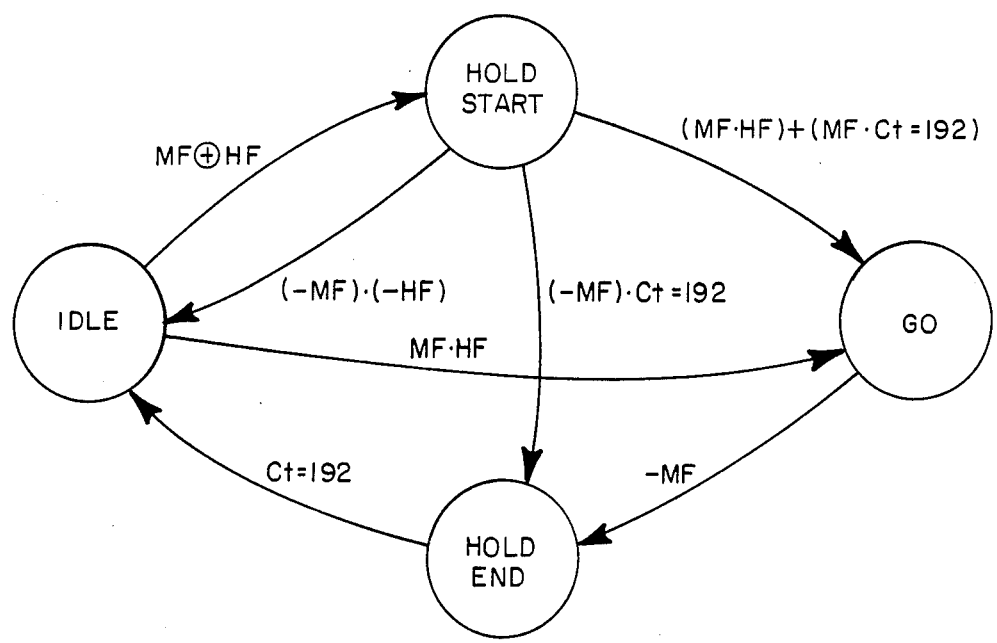
FIG. 5 is a state diagram depicting the operation of the reframing circuitry.

Referring to FIG. 5, the state machine is normally in the IDLE state. Scan counter circuitry (not shown) counts and generates a time slot address which is used to examine a frame alarm register for each copy of the circuit. This frame alarm register contains an out of framing indication for each of the digital spans. The out of frame condition is monitored for each of the digital spans one at a time and a rotational basis.

When a framing alarm condition in either copy is detected, the scanner circuitry is stopped via a signal on the SCANCTEN lead. The scanner is stopped on the particular digital span detected as being in the out of frame condition. When the scanner is stopped, if both copies have their respective alarm indicators set (-MFALFOUND and -HFALFOUND are set), then both copies of the circuit enter the GO state. Then, the reframing operation begins. This is indicated in FIG. 5 by the transition from the IDLE to the GO states shown by (MF and HF) path.

The -MFALFOUND signal is referred to as MF and the -HFALFOUND signal is referred to as HF hereinafter. However, if the two copies of this circuit are not exactly synchronized, one of the alarm signals will be set and the other will not be set. For this condition the transition is made from the IDLE state to the HOLD START state, indicated by the (either MF or HF, but not both, a logical exclusive-OR,) path. If no circuit fault exists, both copies of the out of framing indication will eventually agree. That is, the MF signal and HF signal will both be set. As a result, PROM 101 will be read and the state machine will proceed from the HOLD START state to the GO state where the reframing operation will begin. This transition is made via the (MF and HF) path.

It is to be noted that this path connecting the HOLD START and the GO states also includes as a condition for the transition the logical OR condition of (MF and a count equal to 192). That is, once the counter composed of 4-bit counters 111 and 125 and AND gate 127 has counted 192 time slots and the MF signal is set (regardless of whether the HF signal ever becomes set), then the transition will be made from the HOLD START state to the GO state where reframing will take place.

When the 192 time slot counter expires, the copy of this circuit that has the alarm indicator set, will enter the GO state, while the copy without the alarm set will make the transition from the HOLD START state to the HOLD END state via the (-MF and count equal 192) path.

When the copy of this circuit which has been reframmed finishes the operation, a transition will be made from the GO state to the HOLD END state via the (-MF) path. This path indicates that reframing has been accomplished and that the framing alarm seen by this copy of the circuit will be reset. Therefore, both copies of this circuit will eventually enter the HOLD END state for the particular digital span being reframmed.

When the state machine leaves either the IDLE state or the HOLD START state, the timer composed of 4-bit counters 111 and 125 is restarted. The time delay through the GO state is less than ½ of the total time-out delay. Therefore, both copies of the circuit are in the HOLD END state, the timer composed of 4-bit counters 111 and 125 should be approximately ½ complete in its count to 192. When the timer expires, the transition will be made from the HOLD END state to the IDLE state via the (CT equal 192) path. This indicates that both copies are now in synchronization and the digital span in question has been reframmed. The HOLD END state also allows the two copies to remain synchronized even if, the two reframe operations take slightly different times to complete due to timing skews.

Comparator 128 compares the current value of the frame alarm address, which indicates the identity of the present address of the digital span that is out of framing, with the frame check address. The frame check address is the address of the digital span which is currently being examined for proper framing. When these two addresses are equal, a signal on the EQ lead is present. This indicates that the same digital span being checked is the one presently out of framing. This EQ signal is input to data selector 133.

Normally data selector 133 operates to transmit the ERROR 2/5 directly through to the ERROR output. The ERROR 2/5 signal will indicate an error (framing alarm) if at least two of the last five TS or FS bits have been detected as being in error. Normally the checking circuit is operated in this mode.

A digital span which is being reframmed will spend approximately 3.5 milliseconds in the GO state. When the transition is made from the GO state to the HOLD END state, the Y2 signal will be equal to 1 and the Y1 signal will be equal to 0. As a result, while the state machine is in the HOLD END state and the frame check address is equal to the framing alarm address, the ERROR 1/1 signal will be gated through to the ERROR output signal. The ERROR 1/1 signal will indicate an error, if at least one of the last one (the last one) FS or TS bits have been detected as being in error. Since the total time spent in the HOLD END state is approximately equal to 4.5 milliseconds, the more stringent condition of detecting one error out of any one FS or TS bit will cause the frame alarm signal to be immediately set. An error on the one out of one check indicates that the FS or TS bit selected by the reframing operation has been selected in error.

This scheme prevents false framing due to an improperly selected FS or TS bit during the GO state (reframing process) or due to randomly generate noise. The one of one error checking is done only during the HOLD END state. Once the transition is made from the HOLD END to the IDLE state, two out of five error checking is again resumed. In this manner a double check is provided. Two out of five error checking is constantly done during the IDLE state. Once a reframing operation has been accomplished by transition to the GO state, the HOLD END state will apply the more stringent criteria of one out of one error checking for the TS or FS bits. Any error in the TS or FS bits at this point will cause the frame alarm for that digital span to be set, which will cause another transition to the GO state.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A plurality of digital spans connect one telecommunication system to another telecommunication system, said one telecommunication system including a duplex pair of synchronously operated digital control units, one said digital control unit being operated to scan said plurality of digital spans for proper framing synchronization as an active unit, another digital control unit being operated to scan said plurality of digital spans for proper framing synchronization as a standby unit, each said digital control unit including a framing synchronization arrangement comprising:

clock means being operated to provide periodic time slot signals;

timing means connected to said clock means, said timing means being operated in response to said time slot signals to produce a count signal at a predetermined frequency;

state machine means connected to said other copy of said digital control unit, to said one copy of said digital control unit and to said timing means, said state machine means being operated in response to said count signal, to a framing alarm signal of said one digital control unit and to a framing alarm signal of said other digital control unit to constantly scan each of said plurality of digital spans for proper framing synchronization while in an IDLE state and being further operated to synchronously reframe each of said plurality of digital spans which are detected as being out of proper framing;

said state machine means being operated in response to said framing alarm signal of said one digital control unit being equal to a first value and said framing alarm signal of said other digital control unit being equal to first value to produce a transition from said IDLE state to a GO state for reframing a particular digital span;

said state machine means being operated in response to either said one framing alarm signal being equal to first value or said other framing alarm signal being equal to a first value, but not both, to produce a transition from said IDLE state to a HOLD START state to wait for said framing alarm signal not equal to said first value to become equal to said first value; and said state machine means in said HOLD START state being operated in response to said one framing alarm signal being equal to said first value and said other framing alarm signal being equal to said first value to produce a transition from said HOLD START state to said GO state for performing said synchronous reframing.

2. A frame checking arrangement as claimed in claim 1, said selector means including 8-bit data selector means.

3. A frame checking arrangement as claimed in claim 1, said selector means being further operated in response to said first and second state signals of a first value, corresponding to an IDLE state, to produce said error signal in response to two framing bit errors detected out of a previous five framing bits tested.

4. A frame checking arrangement as claimed in claim 1, said state machine means including memory means connected to each of said digital control units of said duplex pair for receiving said framing alarm signals, said memory means providing a plurality of data outputs.

5. A frame checking arrangement as claimed in claim 7, said state machine means further including latching means connected to said memory means via each of said data outputs; said latching means being further connected to inputs of said memory means in a feedback arrangement; and said latching means being connected to said clock means for receiving said time slot signals.

6. A frame checking arrangement as claimed in claim 8, said timing means including:

first counter means connected to said clock means and to said latching means;

second counter means connected to said clock means, to said latching means and to said first counter means; and gating means connected between said second counter means and said memory means.

7. A frame checking arrangement as claimed in claim 9, said first counter means including 4-bit binary counter means.

8. A frame checking arrangement as claimed in claim 9, said second counter means including 4-bit binary counter means.

9. A frame checking arrangement as claimed in claim 9, said gating means including AND gating means.

10. A frame checking arrangement as claimed in claim 7, said memory means including 32 by 8-bit programmable read only memory means.

11. A frame checking arrangement as claimed in claim 8, said latching means including HEX latching means.

* * * * *